(12) United States Patent
Henrichsen et al.

(10) Patent No.: US 12,297,801 B2
(45) Date of Patent: May 13, 2025

(54) METHOD FOR CONNECTING TWO WIND TURBINE BLADE PORTIONS, METHOD FOR PRODUCING A WIND TURBINE, AND METHOD FOR CONNECTING TWO MOLDED PORTIONS

(71) Applicant: Siemens Gamesa Renewable Energy A/S, Brande (DK)

(72) Inventors: Soeren Randrup Daugaard Henrichsen, Vodskov (DK); Mogens Nielsen, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 212 days.

(21) Appl. No.: 16/916,479

(22) Filed: Jun. 30, 2020

(65) Prior Publication Data
US 2021/0010460 A1 Jan. 14, 2021

(30) Foreign Application Priority Data
Jul. 9, 2019 (EP) .................................... 19185181

(51) Int. Cl.
*B29D 99/00* (2010.01)
*F03D 13/10* (2016.01)
(Continued)

(52) U.S. Cl.
CPC ......... *F03D 13/10* (2016.05); *B29D 99/0028* (2013.01); *B29K 2105/08* (2013.01); *B29K 2307/04* (2013.01); *B29K 2309/08* (2013.01)

(58) Field of Classification Search
CPC ...... F03D 13/10; F03D 1/0675; F03D 1/0633; F03D 9/25; B29D 99/0028;
(Continued)

(56) References Cited

U.S. PATENT DOCUMENTS 9,132,590 B2 * 9/2015 Frydendal ............. B29C 33/424
10,328,640 B2 * 6/2019 Jensen .................... B29C 31/00
(Continued)

FOREIGN PATENT DOCUMENTS

CN     10262970 A     8/2012
CN    104007611 A     8/2014
(Continued)

OTHER PUBLICATIONS

Machine Translation of KR20140001636A1; Cho Young Seok, Jul. 1, 2014 (Year: 2014).*
(Continued)

*Primary Examiner* — Ryan J. Walters
(74) *Attorney, Agent, or Firm* — Schmeiser, Olsen & Watts, LLP (57) ABSTRACT

Provided is a method for connecting two wind turbine blade portions, the method including the steps of: a) providing a first wind turbine blade portion and a second wind turbine blade portion, b) providing a plurality of first markers on the first blade portion and providing a plurality of second markers on the second blade portion, c) determining of target positions of the first markers and the second markers, d) aligning the wind turbine blade portions to each other and comparing actual positions of the first markers and the second markers with the target positions, and e) connecting the wind turbine blade portions together. Therefore, a shape accuracy of a wind turbine blade can be improved.

13 Claims, 6 Drawing Sheets

(51) Int. Cl.
　　　*B29K 105/08*　　　(2006.01)
　　　*B29K 307/04*　　　(2006.01)
　　　*B29K 309/08*　　　(2006.01)

(58) Field of Classification Search
　　　CPC ............ B29K 2105/08; B29K 2307/04; B29K 2309/08; B29L 2031/085; Y02E 10/72; Y02P 70/50; B29C 65/7817; B29C 66/1142; B29C 66/54; B29C 66/98; F05B 2230/60; F05B 2230/604; F05B 2240/302; B22C 9/06
　　　See application file for complete search history.

(56) References Cited

U.S. PATENT DOCUMENTS

| | | | |
|---|---|---|---|
| 10,675,619 B2* | 6/2020 | Reiter | ................. B29C 65/8253 |
| 2017/0043542 A1 | 2/2017 | Jensen et al. | |
| 2017/0113422 A1* | 4/2017 | Maass | ................... B29C 70/386 |
| 2018/0178216 A1 | 6/2018 | Reiter et al. | |

FOREIGN PATENT DOCUMENTS

| | | |
|---|---|---|
| EP | 2075467 A2 | 7/2009 |
| EP | 2432972 A1 | 3/2012 |
| KR | 20140001636 A | 1/2014 |
| WO | 2018091735 | 5/2018 |
| WO | 2018215457 A1 | 11/2018 |

OTHER PUBLICATIONS

European Search Report and Written Opinion of the European Searching Authority dated Dec. 10, 2019 for Application No. 19185181.5.

* cited by examiner

METHOD FOR CONNECTING TWO WIND TURBINE BLADE PORTIONS, METHOD FOR PRODUCING A WIND TURBINE, AND METHOD FOR CONNECTING TWO MOLDED PORTIONS

CROSS-REFERENCE TO RELATED APPLICATIONS

This application claims priority to European Application No. 19185181.5, having a filing date of Jul. 9, 2019, the entire contents of which are hereby incorporated by reference.

FIELD OF TECHNOLOGY

The following relates to a method for connecting two wind turbine blade portions, a method for producing a wind turbine, and a method for connecting two molded portions.

BACKGROUND

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. Further, the rotor blade is connected to the hub by means of a pitch bearing that allows a pitch movement of the rotor blade. Long rotor blades experience high wind forces and are, thus, subjected to heavy loads.

Rotor blades may be made of two half-shells connected to each other. As rotor blades become longer, it may be advantageous to manufacture a rotor blade divided into two or more segments along a longitudinal axis (i.e. longitudinal segments) of the blade. Such blade segments are also known as spanwise segments. Further, such spanwise segments may be casted individually and connected together after casting. EP 2 432 972 B1 shows a method for assembling spanwise segments of a wind turbine blade.

Connecting such spanwise segments of a blade is a challenging task since the segments may come from different molds. It may be important that the blade tip is placed correctly with respect to the blade root and a twist of the blade is as designed and intended. If this is not the case, the loads throughout the blade may change, e.g. during energy generation. This may lead to malfunction. For example, the blade may strike the tower.

SUMMARY

An aspect relates to an improved method for connecting two wind turbine blade portions.

Accordingly, a method for connecting two wind turbine blade portions is provided. The method comprises the steps of: a) providing a first wind turbine blade portion and a second wind turbine blade portion, b) providing a plurality of first markers on the first blade portion and providing a plurality of second markers on the second blade portion, c) determining of target positions of the first markers and the second markers, d) aligning the wind turbine blade portions to each other and comparing actual positions of the first markers and the second markers with the target positions, and e) connecting the wind turbine blade portions together.

Therefore, a shape accuracy of the wind turbine blade can be improved. For example, two, three or more blade portions can be connected together. In particular, each blade portion comprises two blade shells arranged opposite and connected to each other. Providing markers on the blade portion means that the markers are set. Setting the markers may mean that physical markers are connected to the blade portion, created on the blade portion or digital markers are allocated to the blade portion. Aligning means that one of the blade portions or both are moved until the blade portions match as intended.

In particular, the first blade portion comprises an outer surface at which the first markers are provided. The second blade portion comprises an outer surface at which the second markers are provided. In particular, the first markers and the second markers are arranged along a longitudinal direction of the blade. For example, at least three, four, five, six, seven, eight, nine, ten or more first markers are provided in step b). In particular, at least three, four, five, six, seven, eight, nine, ten or more second markers are provided in step b). The wind turbine blade portions are side by side in longitudinal direction of the blade when aligned to each other.

According to an embodiment, the first wind turbine blade portion is molded by means of a first mold and the second wind turbine blade portion is molded by means of a second mold.

In particular, the first and the second blade portions are casted. Molding the blade by means of at least two molds has the advantage that longer blades may by manufactured. The first mold is a multi-part, in particular two-part, mold and/or the second mold is a multi-part, in particular two-part, mold. This has the advantage that the blade portions may be accessible after molding without removing the blade portion from the lower part of the mold which carries the mold. The first mold comprises a hollow space having a negative form of the first blade portion and/or the second mold comprises a hollow space having a negative form of the second blade portion.

According to a further embodiment, step b) is executed when the first wind turbine blade portion is in the first mold and/or the second wind turbine blade portion is in the second mold.

This has the advantage that the first and/or second blade portions are substantially stressless and, thus, undeformed. Step b) is executed during molding or afterwards. For example, the first blade portion lies in the first mold and/or the second blade portion lies in the second mold when step b) is executed. Therefore, a large contact surface between the respective blade portion and the respective mold is provided.

According to a further embodiment, initial positions of the first and the second markers are determined during or immediately after step b).

The initial positions are measured and recorded. Thus, an ideal shape of the blade portion may be reproduced even after handling or manipulating the same.

According to a further embodiment, the target positions of the markers are determined by means of the initial positions of the first and the second markers.

The initial positions of the first markers relative to each other are set as target positions of the first markers. In particular, the initial positions of the second markers relative to each other are set as target positions of the second markers.

According to a further embodiment, the target positions of the first and the second markers are determined by setting a relation between the initial position of the first markers relative to the initial positions of the second markers.

Alternatively or additionally, the target positions are determined by means of computer generated positions. For example, the initial positions can be combined with computer generated positions of the markers for obtaining the target positions of the first and the second markers.

According to a further embodiment, the actual positions of the first and/or the second markers are detected by means of detecting means or a detector during step d).

This has the advantage that an exact alignment can be controlled. The detecting means detector comprise at least one of a sensor, in particular sensors, and a camera, in particular cameras.

According to a further embodiment, step d) is executed by means of digital image correlation.

Digital image correlation and tracking is an optical method that employs tracking and image registration techniques for accurate 2D and 3D measurements of changes in images. This method can be used to measure full-field displacement and strains. Compared to strain gages and extensometers, the amount of information gathered about the fine details of deformation during mechanical tests is increased due to the ability to provide e.g. both local and average data using digital image correlation. This has the advantage that a real time measurement and alignment can be executed.

According to a further embodiment, step d) is executed by means of a carrying device which is configured to move the first wind turbine blade portion in at least 3, 4, 5 or 6 degrees of freedom relative to the second wind turbine blade portion.

The carrying device may comprise a first support structure, in particular a first trolley or yoke, configured to support the first blade portion at one contact surface and a second support structure, in particular a second trolley or yoke, configured to support the first blade portion at another contact surface. For example, the first and the second support structures are configured to move in longitudinal direction of the blade relative to each other when supporting the first blade portion. In particular, the second blade portion is fixed.

The carrying device is configured to move the first blade portion in longitudinal direction of the blade and/or in height direction and/or in a side direction which is perpendicular to the longitudinal direction. The carrying device is configured to rotate or tilt the first blade portion around the longitudinal direction and/or the height direction and/or the side direction.

In particular, the first and the second support structures comprise a lifting system for lifting the blade portion. For example, the first and the second support structures comprise a tilt system for tilting and/or twisting the blade portion. Three, four, five, six or more support structures, in particular a trolleys or yokes, are provided for supporting the first blade portion.

According to a further embodiment, the carrying device is configured to move the second wind turbine blade portion in at least 3, 4, 5 or 6 degrees of freedom relative to the first wind turbine blade portion.

The carrying device may comprise a third support structure, in particular a third trolley or yoke, configured to support the second blade portion at one contact surface and a fourth support structure, in particular a fourth trolley or yoke, configured to support the second blade portion at another contact surface. For example, the third and the fourth support structures are configured to move in longitudinal direction of the blade relative to each other when supporting the second blade portion.

In particular, the third and the fourth support structures comprise a lifting system for lifting the second blade portion. For example, the third and the fourth support structures comprise a tilt system for tilting and/or twisting the second blade portion. Three, four, five, six or more support structures, in particular trolleys or yokes, are provided for supporting the second blade portion.

According to a further embodiment, in step d) and/or e) leading edges of the first and the second wind turbine blade portions face downward or upward.

Thus, handling the blade portion during step d) and/or e) is improved.

According to a further embodiment, the first and the second markers are digitally generated points and/or concretely provided on the respective wind turbine blade portion.

Digitally generated points have the advantage that setting such points can be executed e.g. automatically. Concretely provided markers (i.e. physical markers) have the advantage that such points may be visible without equipment.

According to a further embodiment, the first wind turbine blade portion and the second wind turbine blade portion are longitudinal segments of the wind turbine blade.

This means, when the blade is completed, the segments are arranged one after another along the longitudinal axis of the blade. In particular, an angle between connecting surfaces of the wind turbine blade portions and a longitudinal axis of the wind turbine blade is at least 45°, in particular 90°.

Further, a method for producing a wind turbine is provided. The method comprises the steps of: a2) connecting two wind turbine blade portions according to such a method for connecting two wind turbine blade portions such that a wind turbine blade is provided, and b2) connecting the wind turbine blade to a hub of the wind turbine.

Therefore, a wind turbine having long wind turbine blades can be provided. The method comprises further the steps of providing a tower, a nacelle and a hub of the wind turbine.

Wind turbine presently refers to an apparatus converting the wind's kinetic energy into rotational energy, which may again be converted to electrical energy by the apparatus.

Furthermore, a method for connecting two molded portions is provided. The method comprises the steps of: a3) molding a first portion by means of a first mold and a second portion by means of a second mold, b3) providing first markers on the first portion when the first portion is in the first mold and second markers on the second portion when the second portion is in the second mold, and c3) connecting the first and the second portions together by means of the first and the second markers.

This has the advantage that the first and the second portions are substantially stressless and, thus, undeformed when providing the markers. Therefore, a shape accuracy of two connected portions can be improved. The first and the second portion may be molded by means of casting.

Providing the markers on the first portion means or first portion that the markers are set. The first portion lies in the first mold and/or the second portion lies in the second mold during step b3). Therefore, a large contact surface between the respective portion and the respective mold is provided. The first and the second portions are connected to form a component. The component e.g. may be a wind turbine blade or any other component.

The first mold is a multi-part, in particular two-part, mold and/or the second mold is a multi-part, in particular two-part, mold. The first mold comprises a hollow space having a negative form of the first portion and/or the second mold comprises a hollow space having a negative form of the second portion.

The embodiments and features described with reference to the method for producing a wind turbine blade of embodiments of the present invention apply mutatis mutandis to the method for connecting two molded portions of embodiments of the present invention and vice versa.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with references to the following Figures, wherein like designations denote like members, wherein.

DETAILED DESCRIPTION

Figure 1:
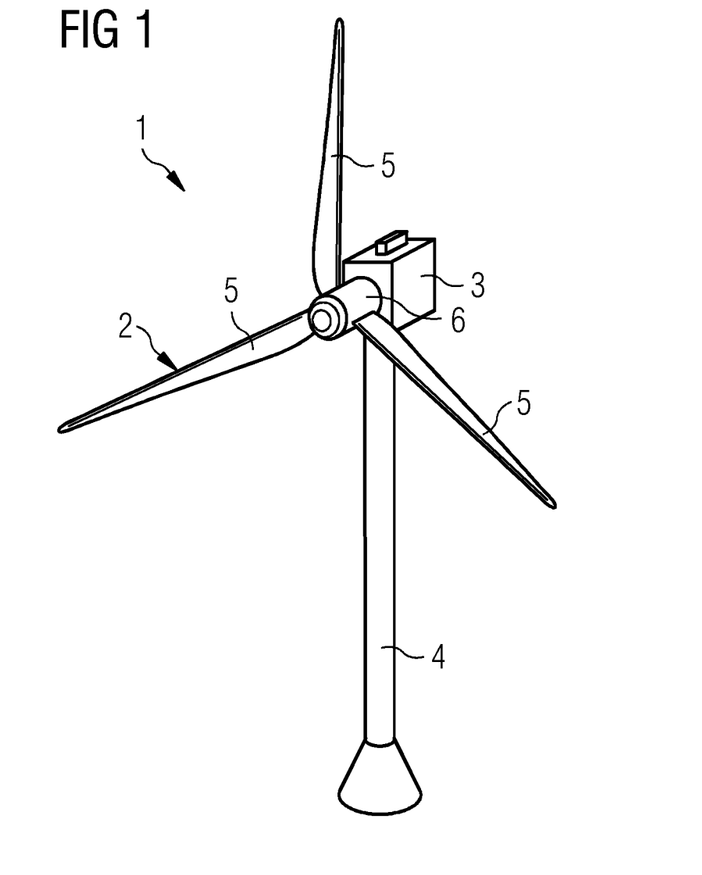
FIG. 1 shows a perspective view of a wind turbine according to one embodiment.

FIG. 1 shows a wind turbine 1. The wind turbine 1 comprises a rotor 2 connected to a generator (not shown) arranged inside a nacelle 3. The nacelle 3 is arranged at an upper end of a tower 4 of the wind turbine 1.

The rotor 2 comprises three blades 5 (i.e. wind turbine blades). The blades 5 are connected to a hub 6 of the wind turbine 1. Rotors 2 of this kind may have diameters ranging from, for example, 30 to 300 meters or even more. The blades 5 are subjected to high wind loads. At the same time, the blades 5 need to be lightweight. For these reasons, blades 5 in modern wind turbines 1 are manufactured from fiber-reinforced composite materials, e.g. by means of casting. Oftentimes, glass or carbon fibers in the form of unidirectional fiber mats are used. Such blades 5 may also include woods and other reinforcement materials.

Figure 2:
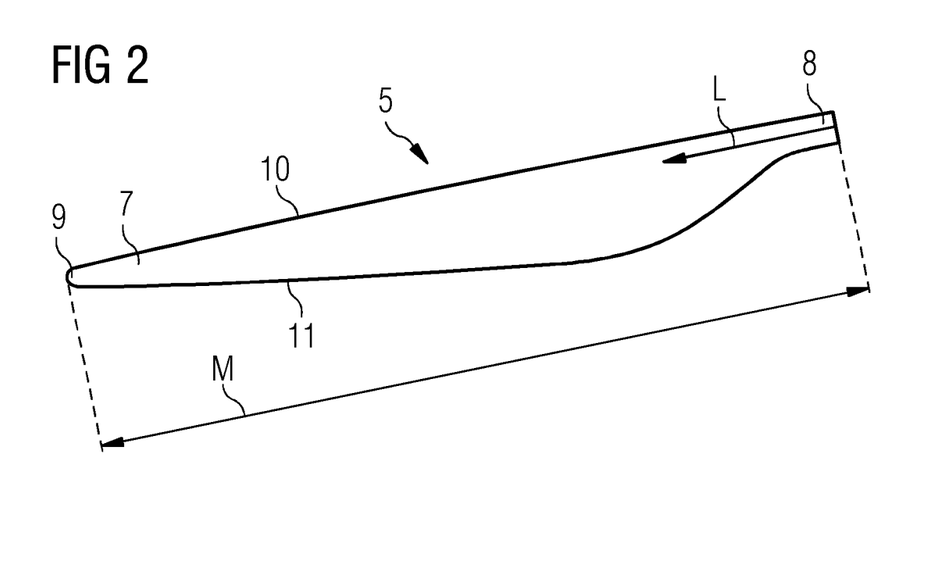
FIG. 2 shows a perspective view of a wind turbine blade of the wind turbine according to FIG. 1.

FIG. 2 shows the blade 5. The blade 5 comprises an aerodynamically designed portion 7 which is shaped for optimum exploitation of the wind energy and a blade root 8 for connecting the blade 5 to the hub 6. Further, the blade 5 comprises a blade tip 9 which faces away from the blade root 8. The blade 5 extends in a longitudinal direction L which points from the blade root 8 towards the blade tip 9. The blade 5 has a length M which, for example, may be between 15 to 100 m or even more. The wind turbine blade 5 comprises a leading edge 10 and a trailing edge 11.

Figure 3:
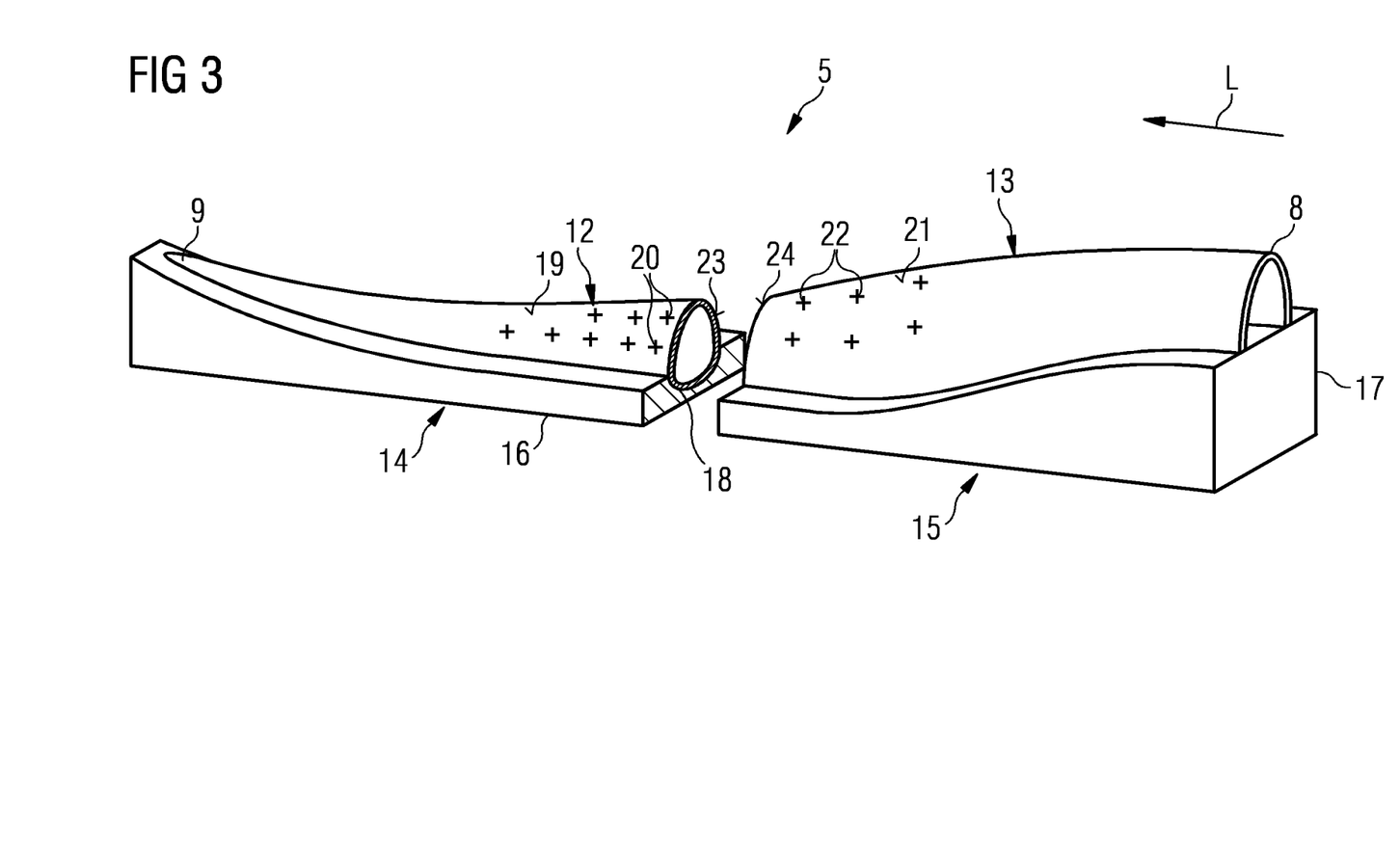
FIG. 3 shows a perspective view of a first and a second wind turbine blade portion each lying in a mold.

FIG. 3 shows a perspective view of a blade portion 12 (also referred as first blade portion) and a blade portion 13 (also referred as second blade portion). The blade portion 12 comprises the blade tip 9 and the blade portion 13 comprises the blade root 8. Further, the blade portion 12 comprises a connecting surface 23 and the blade portion 13 comprises a connecting surface 24. The blade portions 12, 13 are configured to be connected at together the connecting surfaces 23, 24. For example, the connecting surfaces 23, 24 run essentially perpendicular to the longitudinal direction L. The blade portions 12, 13 are longitudinal segments of the blade 5 (see e.g. FIG. 2).

The blade portion 12 is casted by means of a mold 14 (also referred as first mold) and the blade portion 13 is casted by means of a mold 15 (also referred as second mold). The mold 14 is a multi-part mold comprising a lower mold part 16 and an upper mold part (not shown). For example, the upper mold part may be removed after molding the blade portion 12 as shown in FIG. 3. The mold 15 is a multi-part mold comprising a lower mold part 17 and an upper mold part (not shown).

This has the advantage that the blade portions 12, 13 may be accessible after molding without removing the blade portion 12, 13 from the lower mold part 16, 17. The mold 14 comprises a hollow space 18 having a negative form of the blade portion 12. In particular, the mold 15 comprises a hollow space (not shown) having a negative form of the blade portion 13.

As shown in FIG. 3 an outer surface 19 of the blade portion 12 is exposed. Markers 20 (also referred as first markers) are provided on the surface 19. Further, an outer surface 21 of the blade portion 13 is exposed. Markers 22 (also referred as second markers) are provided on the surface 21. The markers 20, 22 can be set when the blade portions 12, 13 lie in the molds 14, 15. Therefore, a large contact surface between the blade portions 12, 13 and the molds 14, 15 is provided.

This has the advantage that the blade portions 12, 13 are substantially stressless and, thus, undeformed.

After providing the markers 20, 22 initial positions of the markers 20, 22 may be determined, e.g. by means of measuring and recording the same. Further, target positions of the markers 20, 22 may be determined by setting a relation between the initial position of the markers 20 relative to the initial positions of the markers 22.

Alternatively, or additionally, the target positions are determined by means of computer generated positions. For example, the initial positions can be combined with computer generated positions of the markers 20, 22 for obtaining the target positions of the markers 20, 22. The markers 20, 22 may be digitally generated points and/or concretely provided or created on the surface 19, 21. In particular, 2-30, 3-10, 3-7, or 4 to 5 markers 20 are provided. For example, 2-30, 3 10, 3-7, or 4 to 5 markers 22 are provided. The markers 20 and/or the markers 22 may be arranged in at least two rows along the longitudinal direction L.

Figure 4:
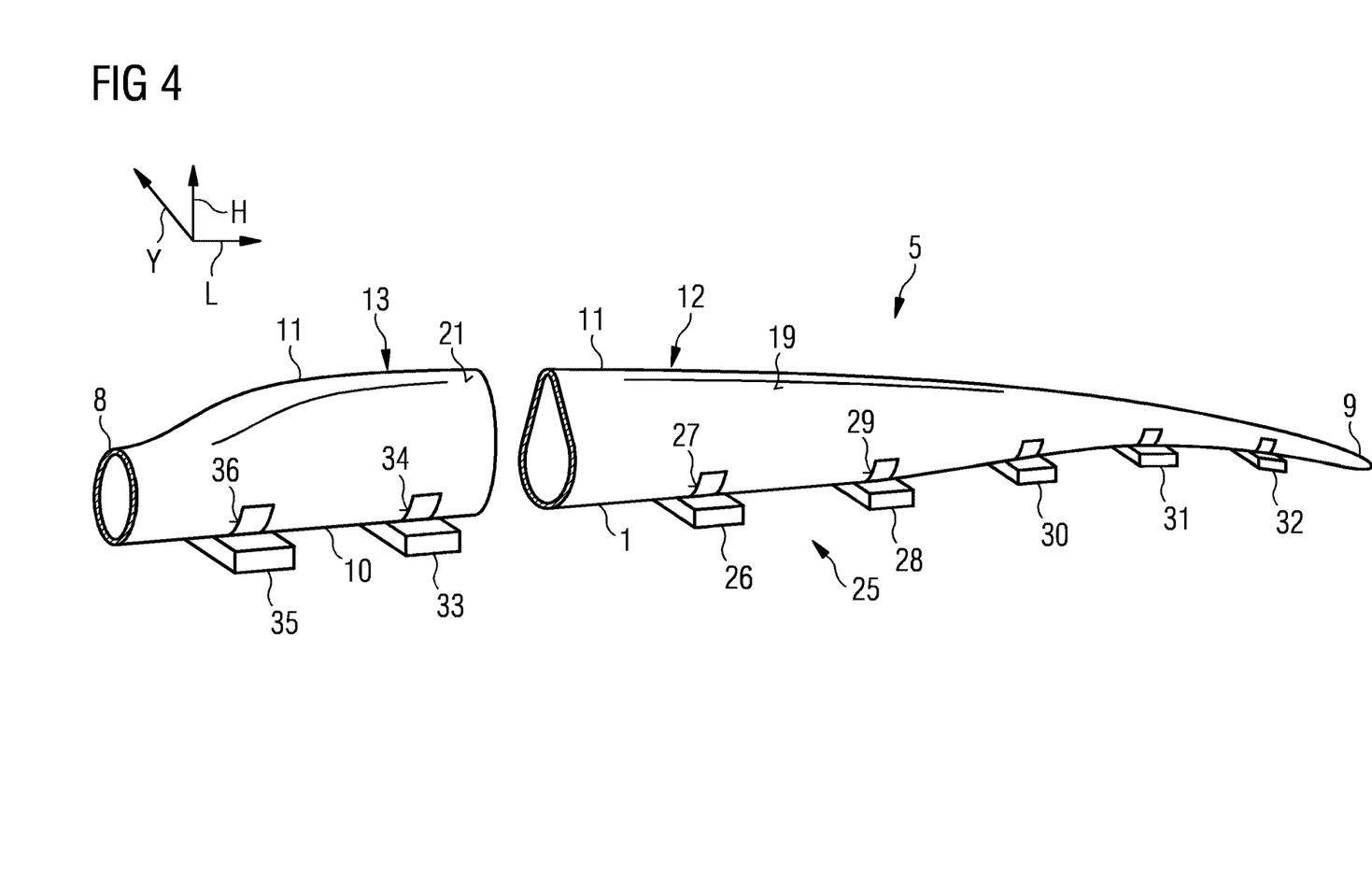
FIG. 4 shows a perspective view of the first and the second wind turbine blade portion carried by a carrying device.

FIG. 4 shows a perspective view of the blade portions 12, 13. The blade portions 12, 13 are carried by a carrying device 25. The carrying device 25 is configured to move the blade portion 12 in at least 3, 4, 5 or 6 degrees of freedom relative to the blade portion 13. In particular, the carrying device 25 is configured to move the blade portion 12 in longitudinal direction L and/or in height direction H and/or in side direction Y which is perpendicular to the height direction H and the longitudinal direction L. The carrying device 25 is configured to rotate or tilt the blade portion 12 around the longitudinal direction L and/or the height direction H and/or the side direction Y.

The carrying device 25 may comprise a support structure 26, in particular a trolley or yoke, configured to support the blade portion 12 at one contact surface 27 and a support structure 28, in particular a trolley or yoke, configured to support the blade portion 12 at another contact surface 29. More support structures 30, 31, 32, in particular trolleys or yokes, are provided for supporting the blade portion 12.

The carrying device 25 may also be configured to move the blade portion 13 in at least 3, 4, 5 or 6 degrees of freedom relative to the blade portion 12. In particular, the carrying device 25 is configured to move the blade portion 13 in longitudinal direction L and/or in height direction H and/or in side direction Y which is perpendicular to the height direction. The carrying device 25 is configured to rotate or tilt the blade portion 13 around the longitudinal direction L and/or the height direction H and/or the side direction Y. The carrying device 25 may comprise a support structure 33, in particular a trolley or yoke, configured to support the blade portion 13 at one contact surface 34 and a support structure 35, in particular a trolley or yoke, configured to support the blade portion 13 at another contact surface 36.

Figure 5:
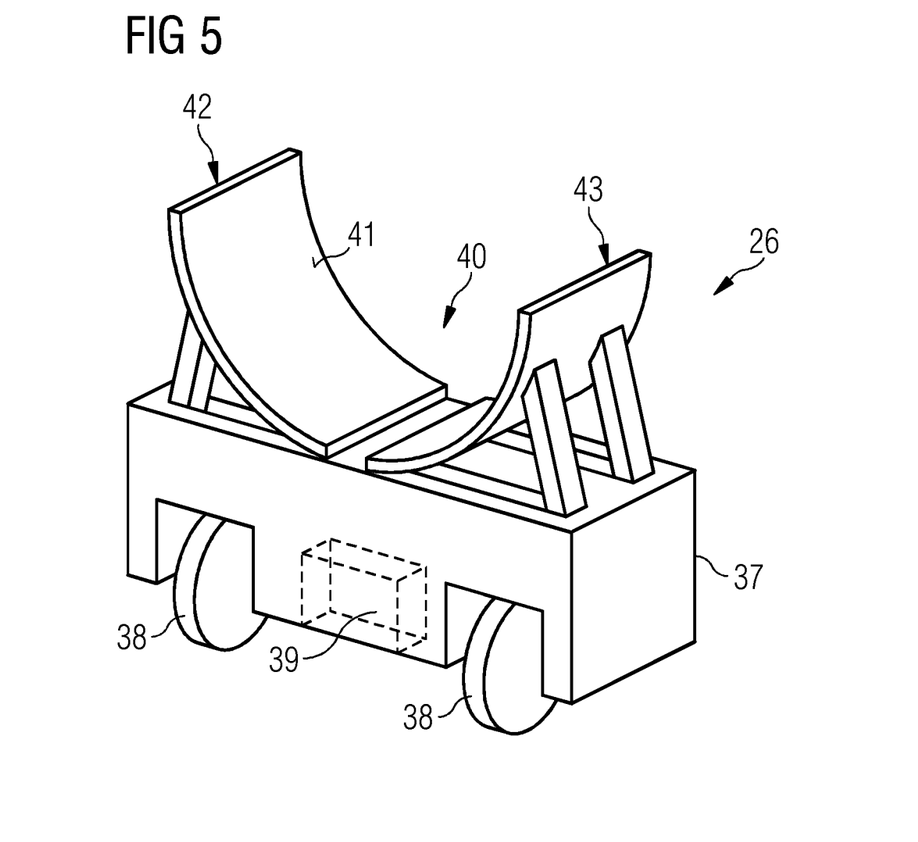
FIG. 5 shows a perspective view of a support structure of the carrying device.

FIG. 5 shows a perspective view of the support structure 26 of the carrying device 25. The support structure 26 comprises a frame 37 to which wheels 38 are connected. Further, a motor 39 may be provided for driving the support structure 26 by means of the motor 39. The support structure 26 is, thus, configured to move in longitudinal direction L (see e.g. FIG. 7).

Further, the support structure 26 comprises a receptacle 40 for receiving the blade portion 12. The receptacle 40 interacts with the contact surface 27 of the blade portion 12 (see FIG. 4) by means of arc shaped surfaces 41 which are provided at, in particular movable, holding shells 42, 43. Each shell 42, 43 may be arc shaped. The holding shells 42, 43 may be arranged side by side forming a V-shape or U-shape.

Figure 6:
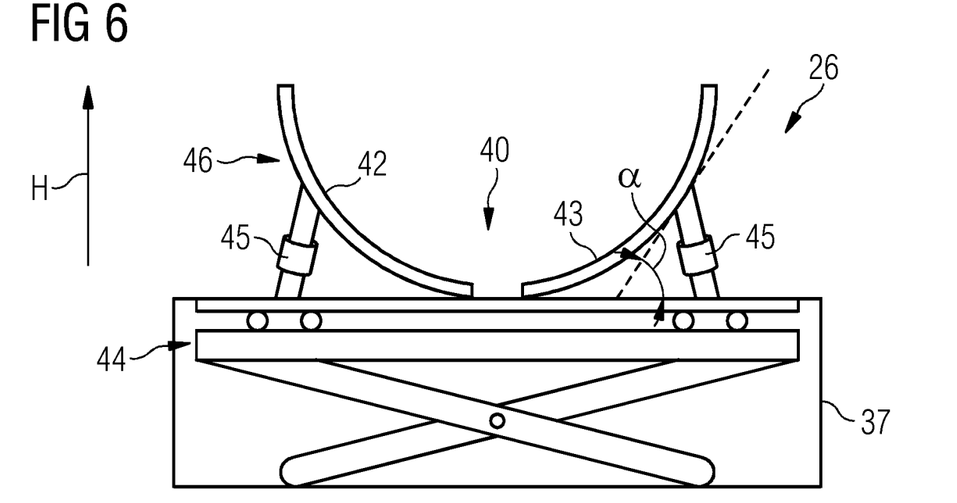
FIG. 6 shows a schematical side view of the support structure.

FIG. 6 shows a schematical side view of the carrying device 26. The support structure 26 comprise a lifting system 44, in particular a lifting platform, for lifting the receptacle 40 and the blade portion 12 (see e.g. FIG. 7) in height direction H. The lifting system 44 may comprise a hydraulic or pneumatic mechanism (not shown) or an electric motor for lifting.

For example, actuators 45 for adjusting a tilt angle α of each shell 42, 43 may be provided. The actuators 45 may be hydraulic, pneumatic or electric actuators. The actuators 45 and the shells 42, 43 may be comprised by a tilt system 46 for tilting and/or twisting the blade portion 12. All support structures 26, 28, 30, 31, 30, 33, 35 may be designed as described for support structure 26.

Figure 7:
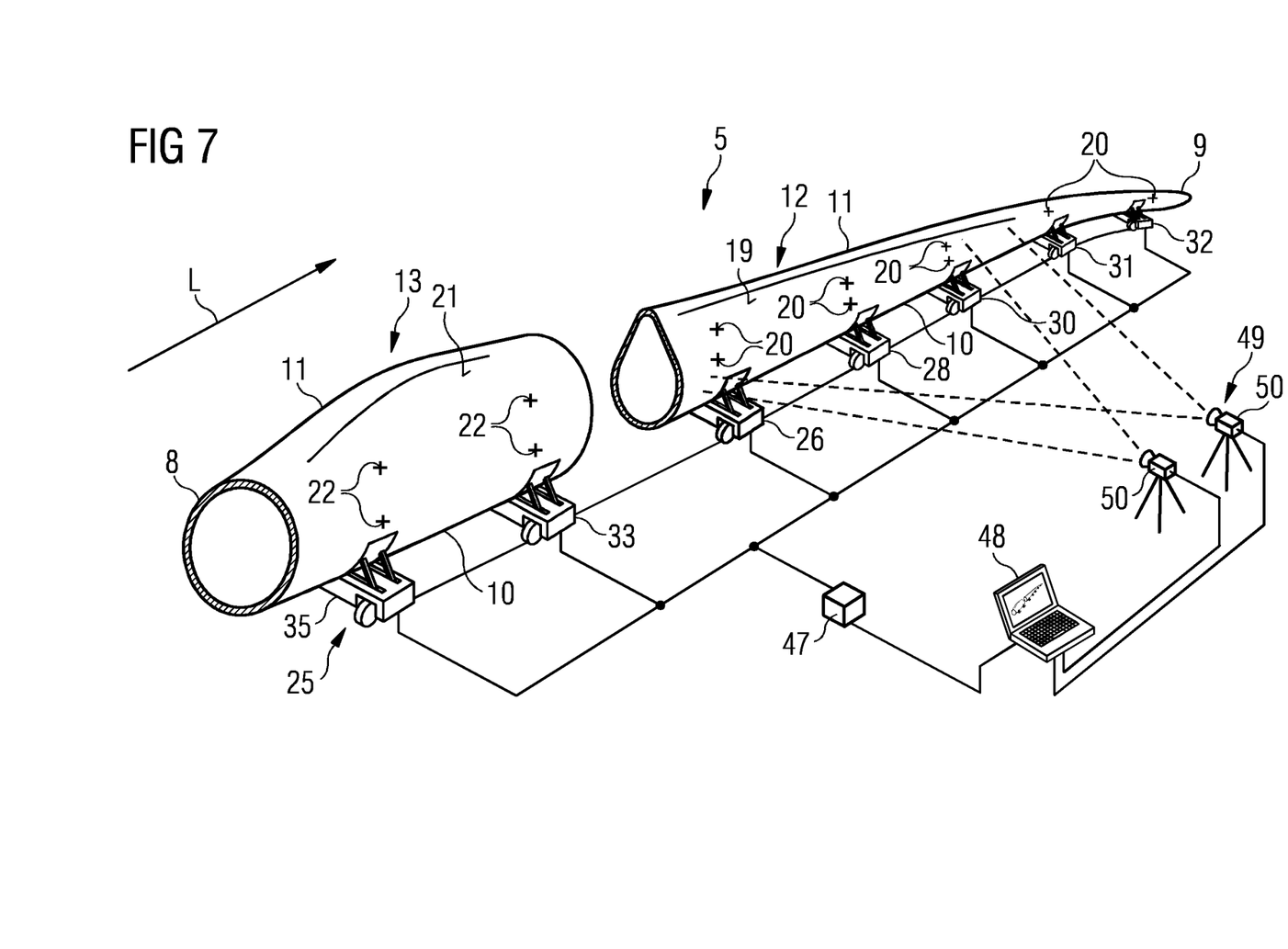
FIG. 7 shows a perspective view of the first and the second wind turbine blade portion when aligning the same to each other.

FIG. 7 shows a perspective view of the blade portions 12, 13 when aligning the same to each other. The carrying device 25 comprises a control unit 47 to which all support structures 26, 28, 30, 31, 30, 33, 35 are (e.g. electrically and/or by means of communication means or a communicator) connected. Further, the control unit 47 may be connected to a computer 48. Furthermore, detecting means 49 may be provide for detecting the actual positions of the markers 20, 22. This has the advantage that an exact alignment between the blade portions 12, 13 can be controlled.

The detecting means comprise sensors and/or a cameras 50, in particular exactly two cameras 50. The detecting means 49 may be connected to the computer 48 and/or the control unit 47. Digital image correlation is applied for measuring the actual positions of the markers 20, 21 and/or a movement of the markers 20, 21. As shown in FIGS. 4 and 7 the leading edges 10 of the blade portions 12, 13 face downward. However, the leading edges 10 of the blade portions 12, 13 may face upward. When the support structures 26, 28, 30, 31, 30, 33, 35 are correctly piloted such that the blade portions 12, 13 are aligned, the blade portions 12, 13 can be connected together.

Figure 8:
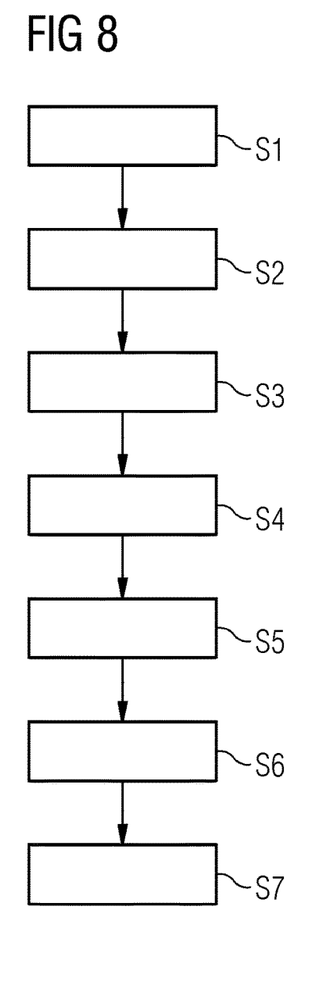
FIG. 8 shows a block diagram of a method for connecting two wind turbine blade portions.

FIG. 8 shows a block diagram of a method for connecting two blade portions 12, 13. In a step S1 the blade portion 12 and the blade portion 13 are provided. The blade portions may be provided by means of casting. In a step S2 a plurality of markers 20 are provided on the blade portion 12 and a plurality of markers 22 are provided on the blade portion 13. In an optional step S3 initial positions (e.g. when the blade portions lie in the molds 14, 15, see FIG. 3) of the markers 20, 22 are determined. Alternatively, or additionally the markers 20, 22 are provided at predetermined positions at the blade portions 12, 13.

In a step S4 target positions of the markers 20, 22 are determined. This can be executed by means of calculating the target positions for a connected blade 5, wherein the initial positions obtained in step S3 may be used as input values. In a step S5 detecting means 49 are provided for detecting actual positions of the markers 20, 22.

In a step S6 the blade portions 12, 13 are aligned to each other and the actual positions of the markers 20, 22 are compared with the target positions until an acceptable deviation is obtained. In a step S7 the blade portions 12, 13 are connected together. In particular, the actual positions of the markers 20, 21 are detected by the detecting means 49 during step S7.

Figure 9:
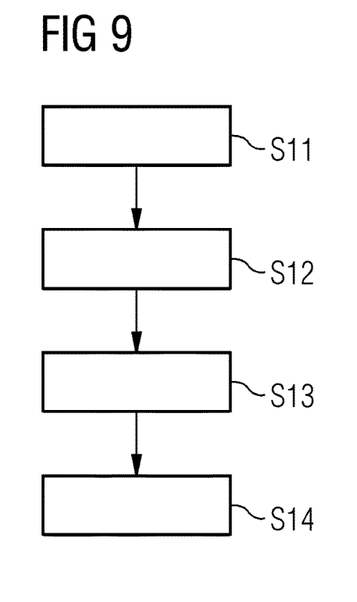
FIG. 9 shows a block diagram of a method for producing a wind turbine.

FIG. 9 shows a block diagram of a method for producing a wind turbine. In a steps S11 the blade which is ready to mount is provided, wherein the blade 5 is provided by the method for connecting two wind turbine blade portions 12, 13 (see FIG. 8). In a step S12 the tower 4 is provided and sited. In a step S13 a nacelle 3 and a hub 6 are connected to the tower 4. In a step S14 a blade 5 is connected to the hub 6 of the wind turbine 1.

Figure 10:
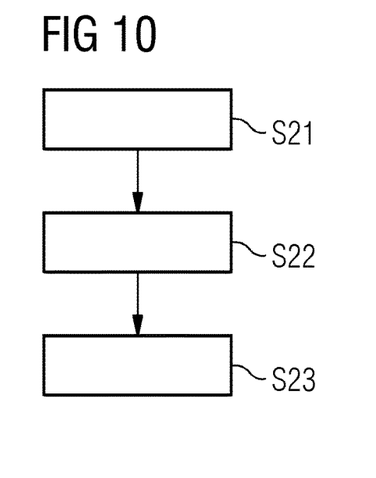
FIG. 10 shows a block diagram of a method for connecting two molded portions.

FIG. 10 shows a block diagram of a method for connecting two molded portions 12, 13. In a step S21 a portion 12 is molded by means of a mold 14 and a portion 13 is molded by means of a mold 15. In a step S22 markers 20 are provided (e.g. set) on the portion 12 when the portion 12 is (e.g. lies) in the mold 14 and markers 22 are provided (e.g. set) on the portion 13 when the portion 13 is (e.g. lies) in the mold 15. In a step S23 portions 12, 13 are connected together by means of the markers 20, 22 to form a component, in particular a blade 5. Therefore, a shape accuracy of two connected portions can be improved.

The features explained with reference to FIG. 1-7 apply mutatis mutandis to the methods of FIG. 8-10.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for connecting two wind turbine blade portions, the method comprising the steps of:
   a) providing a first wind turbine blade portion and a second wind turbine blade portion, wherein the first wind turbine blade portion is in a first lower mold part such that an upper portion of an outer surface of the first blade portion includes an exposed outer surface of the first blade portion and a lower portion of the outer surface of the first blade portion is not exposed, and wherein the second wind turbine is in a second lower mold part such that an upper portion of an outer surface of the second blade portion includes an exposed outer surface of the second blade portion and a lower portion of the outer surface of the second blade portion is not exposed,
   b) providing a plurality of first markers on the exposed outer surface of the first blade portion while the first blade portion is still in the first lower mold part and providing a plurality of second markers on the exposed outer surface of the second blade portion while the second blade portion is still in the second lower mold part,
   c) determining target positions of the first markers and the second markers after the first blade portion has been removed from the first lower mold part and the second blade portion has been removed from the second lower mold part,
   d) aligning the wind turbine blade portions to each other and comparing actual positions of the first markers and the second markers with the target positions, wherein the aligning and/or the comparing are executed by digital image correlation, and
   e) connecting the wind turbine blade portions together.

2. The method according to claim 1, wherein in step a) the first wind turbine blade portion is molded by a first mold including the first lower mold part and the second wind turbine blade portion is molded by a second mold including the second lower mold part.

3. The method according to claim 2, wherein the first markers are created after molding of the first blade portion and/or the second markers are created after molding of the second blade portion.

4. The method according to claim 1, wherein initial positions of the first and the second markers are determined during or immediately after step b).

5. The method according to claim 4, wherein the target positions of the first markers and/or the second markers are determined by the initial positions of the first markers and/or the second markers.

6. The method according to claim 5, wherein the target positions of the first markers and the second markers are determined by setting a relation between the initial position of the first markers relative to the initial positions of the second markers.

7. The method according to claim 1, wherein the actual positions of the first and/or the second markers are detected during step d) by detecting means or detector.

8. The method according to claim 1, wherein step d) is executed by a carrying device which is configured to move the first wind turbine blade portion in at least 3, 4, 5 or 6 degrees of freedom relative to the second wind turbine blade portion.

9. The method according to claim 8, wherein the carrying device is configured to move the second wind turbine blade portion in at least 3, 4, 5 or 6 degrees of freedom relative to the first wind turbine blade portion.

10. The method according to claim 1, wherein in step d) and/or e) leading edges of the first and the second wind turbine blade portions face downward or upward.

11. The method according to claim 1, wherein the first and the second markers are digitally generated points and/or concretely created on the respective wind turbine blade portion.

12. The method according to claim 1, wherein the first wind turbine blade portion and the second wind turbine blade portion are adjacent longitudinal segments of a wind turbine blade.

13. A method for producing a wind turbine, the method comprising the steps of:
   a2) connecting two wind turbine blade portions according to the method of claim 1 such that the wind turbine blade is provided, and
   b2) connecting the wind turbine blade to a hub of the wind turbine.

* * * * *